US006781082B1

(12) United States Patent
Osborne

(10) Patent No.: US 6,781,082 B1
(45) Date of Patent: Aug. 24, 2004

(54) INCREASED WHEEL UNIFORMITY THROUGH EDM PROCESS

(75) Inventor: Martin Osborne, Ann Arbor, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/642,963

(22) Filed: Aug. 14, 2003

(51) Int. Cl.[7] .......................... B23H 1/00; B23H 7/26; B23H 9/00
(52) U.S. Cl. .................. 219/69.2; 219/69.17
(58) Field of Search .................. 219/69.17, 69.2

(56) References Cited

U.S. PATENT DOCUMENTS

| | | | | |
|---|---|---|---|---|
| 2,938,104 A | * | 5/1960 | Paillarse | 219/69.2 |
| 3,878,353 A | * | 4/1975 | Anderson | 219/69.17 |
| 4,134,807 A | * | 1/1979 | Briffod | 205/661 |
| 4,471,200 A | | 9/1984 | Takahashi et al. | |
| 5,117,081 A | * | 5/1992 | Bagdal | 219/69.11 |
| 6,261,153 B1 | | 7/2001 | Dickerson et al. | |
| 6,296,549 B1 | | 10/2001 | Dickerson et al. | |
| 6,505,716 B1 | | 1/2003 | Daudi et al. | |

FOREIGN PATENT DOCUMENTS

JP     6-91432 A   *   4/1994

OTHER PUBLICATIONS

Electrical Discharge Machining; Fundamental Manufacturing Processes Video Series Study Guide, Society of Manufacturing Engineers. http:// www.sme.org.
Everything You Need to Know About Dielectric Fluids. Sparks, Fall 2000, © Copyright 2000 Intech Technology Corporation. http://www.Intech–EDM.com.
Fobian, John. Tire and wheel runout. Chrysler 22–01–97, Jun. 13, 1997. Service Technicians Society®. http://sts.sae-.org.
Fuller, John E., Rockwell International. Electrical Discharge Machining. Nontraditional Machining Processes, pp. 557–561.
Electrical Discharge Grinding, Nontraditional Machining Processes, pp. 565–567.
Tire & Wheel—Runout. No. 22–01–97; Jun. 13, 1997. 1996 Jeep Truck Grand Cherokee 4WD V8–318 5.2LMVIN Y MFI [retrieved on Mar. 19, 2003]. Retrieved from the Internet: <URL; http://home.sc.it.com/janet/TSB/22–01–97.htm.

* cited by examiner

*Primary Examiner*—Geoffrey S. Evans
(74) *Attorney, Agent, or Firm*—MacMillan, Sobanski & Todd, LLCC

(57) ABSTRACT

An EDM apparatus for reducing wheel runout includes a support structure. The support structure is adapted to support and rotate a vehicle wheel. An electrode is also included for electric discharge machining at least one surface of the vehicle wheel.

26 Claims, 5 Drawing Sheets

INCREASED WHEEL UNIFORMITY THROUGH EDM PROCESS

BACKGROUND OF THE INVENTION

This invention relates in general to machine tools and finishing operations for vehicle wheels and in particular to machine tools and finishing operations for vehicle wheels that reduce radial runout.

One conventional process for manufacturing vehicle wheels involves pouring molten metal into a wheel mold to form a one piece wheel casting. Typically, one piece wheels are cast with an alloy of a light metal, such as aluminum. After the molten metal solidifies, the wheel casting is removed from the mold. The wheel casting is oversized and is machined to final shape.

Another process involves, a full face wheel disc, which includes the outboard tire bead retaining flange, that is cast or forged from a lightweight alloy and-machined to final shape. A partial wheel rim, which can be rolled from a strip of metal, for example steel, is then welded to an inboard surface of the wheel disc to form a two piece wheel. Such a wheel can combine the low cost and strength of a steel rim with a pleasing aesthetic appearance of a wheel disc cast from a lightweight metal and is usually referred to as a bimetal wheel.

A third process utilizes a wheel disc stamped from steel that is welded to a rolled full wheel rim to form a wheel.

Machining a wheel or wheel disc, regardless of how formed, typically includes multiple operations. First, sawing machines cut casting gates and risers from wheel castings. Then, a drilling machine is used to drill wheel mounting holes through the wheel hub. Next, the wheel is mounted upon a wheel lathe for machining to its final shape. During the lathe operations, the wheel is rotated and a cutting tool is applied against the wheel surfaces. The inside surface of the wheel hub is usually faced to provide a flat mounting surface. Similarly, the outboard wheel disc surface is finished to its final contour. Then, the outside of the wheel rim is turned to its final shape. Optionally, the inside surface of the wheel rim may also be turned to a final shape. The inboard and outboard tire beadseats are turned. The central pilot hole is usually drilled while the casting is clamped in the lathe for turning the inboard tire beadseat.

Referring to the drawings, FIG. 1 illustrates a typical one piece vehicle wheel 10. The vehicle wheel 10 can be cast or forged from an aluminum alloy to produce a wheel casting or forging having physical dimensions that are close to the desired final wheel dimensions. The casting is then machined to the desired final dimensions. Vehicle wheels also may be formed from any other suitable material, such as steel, and may be formed by any other suitable process, such as welding a partial wheel rim rolled from a strip of steel to a cast full face wheel disc.

The vehicle wheel 10 includes an annular wheel rim 20, which carries a tire. The annular wheel rim 20 of the vehicle wheel 10 has an inner annular surface 22 and an outer annular surface 24. An inboard tire beadseat 26 and an outboard tire beadseat 28, which support the tire beads formed upon the ends of the walls of a pneumatic tire (not shown), are formed on the outer annular surface 24 at the inboard and outboard ends 27 and 29 of the wheel rim 20. The inboard and outboard tire beadseats 27 and 29 cooperate with the tire beads of the pneumatic tire (not shown) to form a seal. In addition, wheel flanges 30 and 31 and safety humps 32 and 33 are formed at the inboard and outboard ends 27 and 29 of the rim 20 for retaining the pneumatic tire (not shown) on the vehicle wheel 10.

The vehicle wheel 10 also includes a circular inner wheel disc 12 formed across the outboard end 29 of the annular wheel rim 20. The inner wheel disc 12 has a central hub portion 14 supported within the annular wheel rim 20 by a plurality of wheel spokes 19. The inner wheel disc 12 mounts the vehicle wheel 10 on an associated drive member (not shown), such as a vehicle axle. The central hub portion 14 has a central pilot hole 16 cast and machined therein, in which the associated drive member end is closely received. A plurality of wheel bolt holes 18 are cast into the central hub portion 14 for receiving wheel studs, which cooperate with wheel nuts, to secure the vehicle wheel to the associated drive member. Alternatively, the central pilot hole 16 and the plurality of wheel bolt holes 18 may be machined into the central hub portion 14 using conventional machining techniques.

When the vehicle wheel 10 is machined, the inboard and outboard tire beadseats 26 and 28 are turned. To minimize vibration, it is desirable that the inboard and outboard tire beadseats 26 and 28 have uniform radii, meaning that every point on the beadseats 26 and 28 be equidistant from a central axis Z of the vehicle wheel 10. Ideally, the beadseats 26 and 28 are perfect circles with centers that are coincident with the central axis Z of the vehicle wheel 10. A measure of the tire beadseat radial uniformity is radial runout. Radial runout is the radial distance between the "highest point" and the "lowest point" on the annular wheel rim 20 as measured from the axis Z of the vehicle wheel 10. As shown in FIG. 1, the radial runout of the outboard tire bead seat 28 can be described as the difference between two radii X and Y, where X is the shortest radial distance from the axis Z to the outboard tire beadseat 28 and Y is the longest radial distance from the axis Z to the outboard tire beadseat 28.

SUMMARY OF THE INVENTION

This invention relates in general to machine tools and finishing operations for vehicle wheels and in particular to machine tools and finishing operations for vehicle wheels that reduce radial runout.

When the outside surface of the wheel rim is machined, the tire beadseats are turned. Even when machined under optimal conditions a vehicle wheel rim will have some radial runout. Machining upon a conventional wheel lathe, the current processes for finishing the beadseats, is, at best, typically capable of producing a radial runout within a range of 0.005 inches (0.127 Millimeters) to 0.010 inches (0.258 Millimeters). Radial runout will tend to increase when machining conditions are less than optimal, for example, when the wheel is not mounted upon the lathe with the wheel axis coincident with the lathe axis. Excessive radial runout in the tire beadseats may cause undesirable vibrations in a vehicle even when the tires and wheels have been balanced. Accordingly, it would be desirable to reduce radial runout.

The present invention contemplates using an Electric Discharge Machining (EDM) apparatus for machining tire beadseats to reduce radial runout. EDM is a thermal erosion process in which material is removed by a series of recurring electrical discharges between an electrode and a workpiece, in the presence of a dielectric fluid. The EDM apparatus includes a support structure that is adapted to support a vehicle wheel. The apparatus further includes an electrode for machining at least one beadseat of the vehicle wheel.

The invention also contemplates a method for using the apparatus that includes the step of providing an EDM apparatus having at least one electrode. A vehicle wheel is mounted upon the EDM apparatus. The vehicle wheel is immersed in a dielectric fluidic bath and then rotated. The vehicle wheel is then moved toward the electrode and voltage is applied to the electrode. As the vehicle wheel continues to move toward the electrode, at least one spark is generated between the electrode and the vehicle wheel. The resulting spark removes material from the tire beadseats of the vehicle wheel to reduce radial runout.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
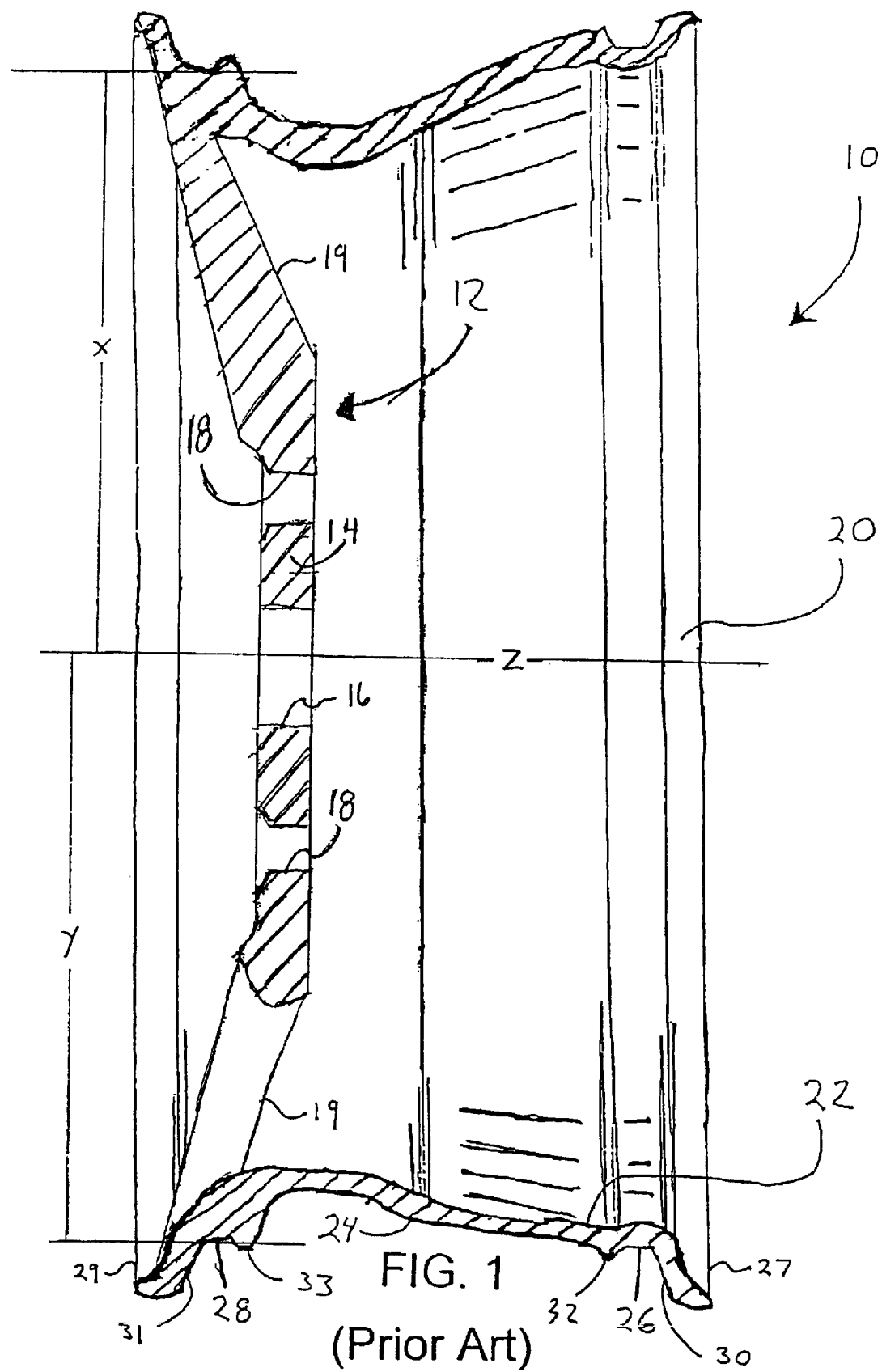
FIG. 1 is a sectional view of a typical vehicle wheel.
Figure 2:
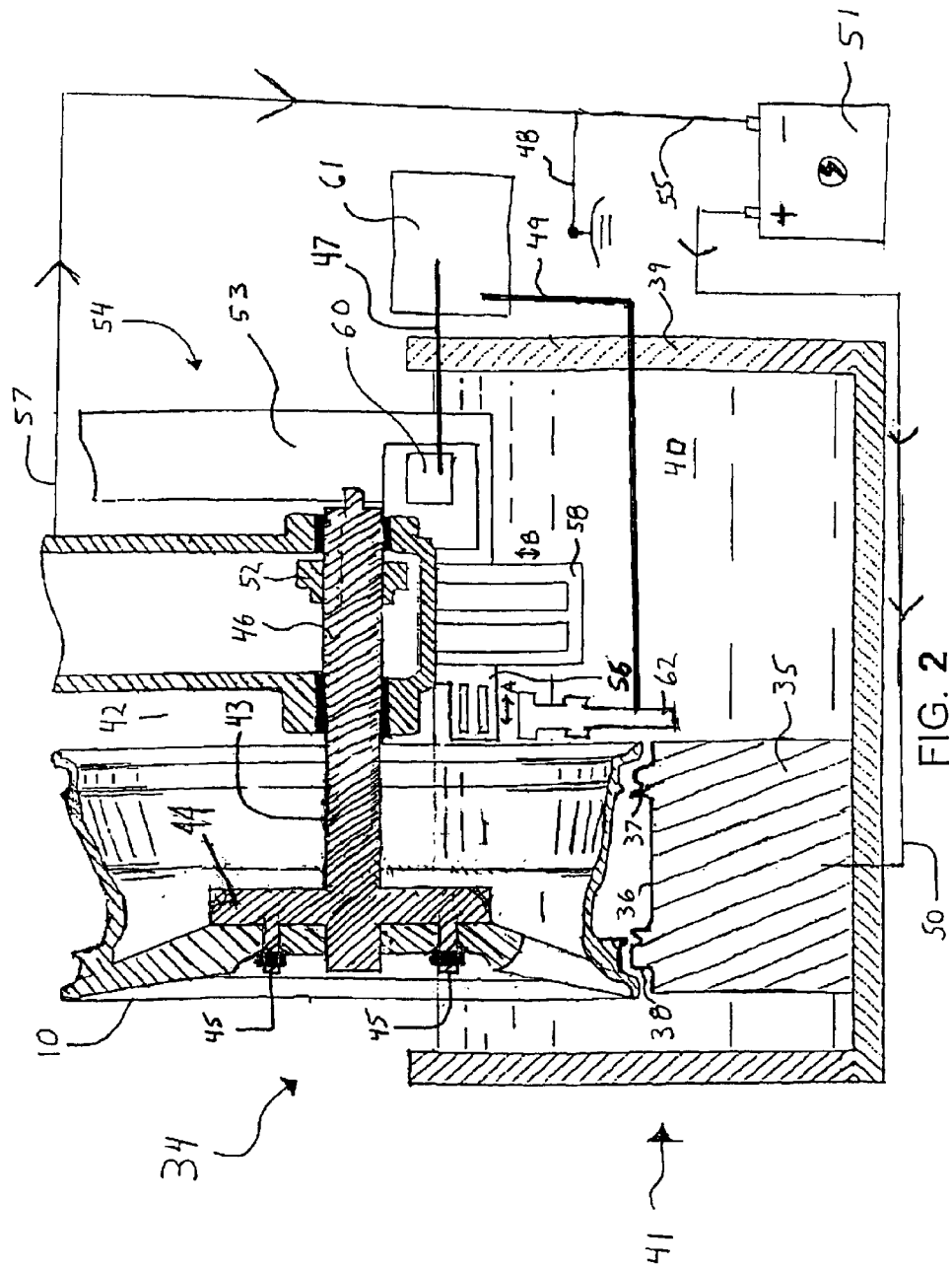
FIG. 2 is a sectional view of an Electrical Discharge Machining apparatus for machining a vehicle wheel that is in accordance with the present invention.
Figure 3:
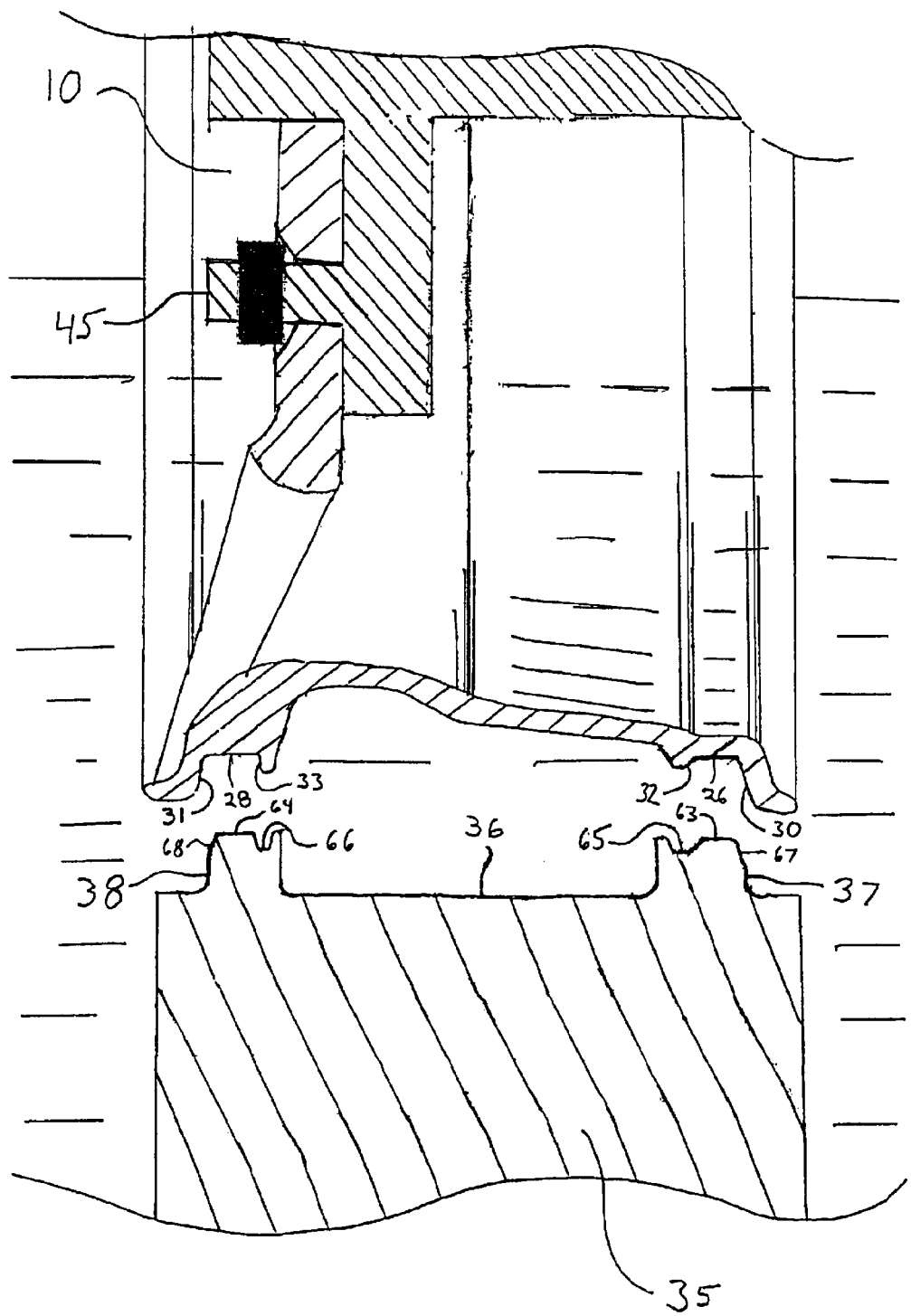
FIG. 3 is a sectional view of an enlarged portion of the Electrical Discharge Machining apparatus of FIG. 2.

For purposes of description herein, the terms "upper," "lower," "inner," "outer," "inboard," "outboard," "right," "left," "rear," "front," "vertical," "horizontal," and derivatives thereof shall relate to the invention oriented in FIGS. 1, 2 and 3. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring again to the figures, there is shown in FIG. 2, a portion of an Electric Discharge Machining (EDM) apparatus in accordance with the present invention, indicated generally at 34. The EDM apparatus 34 can also be referred to as an Electric Discharge Grinding (EDG) apparatus. The EDM apparatus 34 is intended to provide the final machining step for the tire beadseats 26 and 28 of the one piece vehicle wheel 10 shown in FIG. 1. However, it will be appreciated that vehicle wheels other than the specific vehicle wheel 10 shown in FIG. 1 may be machined in accordance with the present invention. The EDM apparatus 34 includes an electrode 35. The electrode 35 is preferably composed of brass or copper, however, other suitable materials may be used, such as tungsten or graphite. The electrode 35 has a discharge surface 36. The discharge surface 36 includes projecting portions that are shaped as the inverse of the shape of the beadseats 26 and 28, as indicated at 37 and 38 respectively. The shape of the electrode 35 is best seen in FIG. 3, where each of the projecting portions 37 and 38 includes an intermediate beadseat detail portion 63 and 64 for forming the base of the tire beadseats 26 and 28. At one end of the intermediate beadseat detail portions 63 and 64 are concave shaped recesses 65 and 66 for forming the bead humps 32 and 33 respectively. At the other end of the intermediate beadseat detail portions 63 and 64 are generally arcuate portions 67 and 68 for forming the base contour of the retaining flanges 30 and 31 respectively. The electrode portions adjoining the arcuate portions 67 and 68 are tapered to avoid EDM of the principal portions tire bead-retaining flanges 30 and 31.

The electrode 35 is thus fabricated with the reverse or negative image of desired finished shape of the workpiece. The workpiece cavity is expected to be measurably larger than the projecting portions of the electrode 35. This dimensional difference, i.e. overcut or kerf, is taken into account during the fabrication of the electrode 35.

The electrode 35 is mounted upon the bottom surface of a tank 39. The tank 39 is filled with a dielectric fluid, such as dielectric oil 40, to form a dielectric fluidic bath 41. As shown in FIG. 2 the electrode 35 is completely submerged in the dielectric bath 41. In an alternate embodiment, the exterior of the tank 39 is electrically insulated for safety.

The EDM apparatus 34 further includes a vertical, spindle support arm 42. A spindle 43 is rotatably mounted upon the spindle support arm 42. A wheel mount 44 is formed on one end of the spindle 43 for mounting the vehicle wheel 10 upon the EDM apparatus 34. As shown in FIG. 2, the vehicle wheel 10 is secured to the wheel mount 44 by threaded fasteners 45. Alternatively, the vehicle wheel 10 may be secured by a clamping device (not shown) or any other suitable means. The spindle 43 further includes a shaft portion 46, which extends from the center of the wheel mount 44. As shown in FIG. 2, the spindle 43 is shown as one piece including the wheel mount 44 and the shaft 46. Alternatively, the wheel mount 44 and the shaft 46 may be separate pieces joined to form the spindle 43 (not shown). A drive pulley 52 is mounted upon an end of the shaft 46 opposite from the wheel mount 44. A motor (not shown) is drivingly coupled to the pulley 52 for rotating the spindle 43. The vehicle wheel 10 spins as the spindle 43 rotates.

In the preferred embodiment, the EDM apparatus 34 also includes a conventional mechanical dual axis positioning mechanism 54 for positioning the vehicle wheel 10 at a location relative to the electrode 35. The positioning mechanism 54 includes a positioning support arm 53, which carries the spindle support arm 42. The positioning support arm 53 has a horizontal guide member 56 and a vertical guide member 58. The positioning mechanism 54 further includes a positioning driver 60, which moves the spindle support arm 42 along the horizontal and vertical guides 56, 58 for aligning the vehicle wheel 10 in the proper horizontal and vertical position. The positioning driver 60 moves the spindle support arm 42 along the horizontal guide 56 to align the vehicle wheel 10 horizontally, relative to the electrode 35, as illustrated by a small double headed horizontal arrow labeled A in FIG. 2. Similarly, the positioning driver 60 moves the spindle support arm 42 along the vertical guide 58 to align the vehicle wheel 10 vertically, relative to the electrode 35, as illustrated by a small double headed vertical arrow labeled B in FIG. 2. A positioning control unit 61, which in the preferred embodiment includes a microprocessor (not shown), is electrically connected to the positioning driver 60; as shown by a line 47 in FIG. 2. Preferably, a spark sensor 62 is also electrically connected to the microprocessor in the positioning control unit 61, as shown by a line 49 in FIG. 2. Alternatively, a current sensor (not shown) is electrically connected to the microprocessor. As will be described below, the microprocessor is responsive to signals generated by the spark sensor 62 to operate the positioning driver 60.

The spindle support arm 42 is electrically grounded, as indicated at 48, by a line labeled 57. The EDM apparatus 34 further includes a power supply 51, preferably a pulsed direct current power supply. Preferably, the power supply 51 is operative to regulate voltage, current, duration, duty cycle, frequency, and polarity. The power supply 51 is electrically grounded by a line labeled 55. The power supply 51 is electrically connected to the electrode 35 by a line labeled 50. Electrons flow from the electrode 35 to the vehicle wheel 10. When the vehicle wheel 10 is mounted upon the wheel mount 44, the vehicle wheel 10 is also connected to ground through the spindle 43 and the spindle support arm 42.

Again, referring to FIG. 3, when the vehicle wheel 10 spins in sufficient proximity to the electrode 35, sparks arc across the gap between the discharge surface 36 and the vehicle wheel 10, particularly between the beadseats 26 and 28 and the portion of the electrode 35 shaped as the inverse of the beadseats, as indicated at 37 and 38 respectively. Heat from the sparks vaporizes minute particles of excess material from the beadseats 26 and 28, which are then washed away from the gap by the dielectric fluid, and thereby finish the beadseats 26 and 28 with minimal runout. The process partially consumes the electrode 35. Eventually, the electrode 35 is consumed by the process to a point that the performance of the EDM apparatus 34 is adversely affected. Accordingly, the present invention contemplates periodic replacement of the electrode 35.

The EDM Process is a non-contact process that generates no cutting force and thus permits machining to produce burr-free edges, intricate detail, and superior finish as compared to conventional machining processes.

The operation of the apparatus will now be described. The vehicle wheel 10 is spun by the spindle 43. The positioning control unit 61 is operative to cause the positioning driver 60 to move the spindle support arm 42. The positioning driver 60 moves the spindle support arm 42 along the horizontal and vertical guides 56, 58 toward the desired position adjacent the electrode 35.

In the preferred embodiment, first, the vehicle wheel 10 is moved horizontally in FIG. 2 to position the tire beadseats 26 and 28 above the projecting portions 37 and 38 of the electrode 35. Then, the vehicle wheel 10 is moved in a downward direction in FIG. 2 toward the electrode 35 and voltage is applied to the electrode 35 from the power supply 51 to initiate the EDM process. Preferably, the power supply 51 is operative to provide thousands of direct current impulses per second. As the vehicle wheel 10 approaches the electrode 35, sparks begin to arc across the space between the projecting portions 37 and 38 and the high points on the tire beadseats 26 and 28. Preferably, the spark temperatures generated range from 14,000° to 21,000° Fahrenheit. The number of sparks increase as the distance between the electrode 35 and the vehicle wheel 10 decreases. The sparks vaporize minute particles of material from the tire beadseats 26 and 28, which are then washed away from the gap by the dielectric fluid. When a sufficient number of sparks exist, i.e. proper current flow has been attained, the vehicle wheel 10 is properly positioned relative to the electrode 35 for machining. In the preferred embodiment, the spark sensor 62 measures the intensity, i.e. quantity/unit of time, of sparks between the electrode 30 and the vehicle wheel 10. The spark sensor 62 generates a signal that is proportional to the magnitude of spark intensity. The spark sensor signal is supplied to the microprocessor in the positioning control unit 61, which monitors the magnitude of the sensor signal. In an alternate embodiment, the current sensor (not shown) measures the magnitude of the current flow through the electrode 35 and the vehicle wheel 10.

Alternatively, the microprocessor in the positioning control unit 61 instructs the positioning driver 60 to position the vehicle wheel 10 relative to a set of predetermined vertical and horizontal coordinates, which are produced by an operator (not shown). Then, voltage is applied to the electrode 35.

The operation continues either through preprogrammed instructions or real-time control. Generally as sparks remove metal from the vehicle wheel surface, the gap between the electrode 35 and the vehicle wheel 10 increases, and the magnitude of spark intensity and/or current flow drops. In the preferred embodiment, under real-time control, the microprocessor in the positioning control unit 61 is responsive to the reduced magnitude of spark intensity and/or current flow to cause the positioning driver 60 to adjust the position of the vehicle wheel 10 throughout the machining process, i.e. move the vehicle wheel 10 farther toward the electrode 35 as the magnitude of spark intensity and/or current flow drop. As shown in FIG. 2, this would be downward vertical movement. During real-time control, the spark sensor 62 continually provides the positioning control unit 61 with the magnitude of spark intensity. The positioning control unit 61 is responsive to the spark sensor information to continually adjust the vertical position of the vehicle wheel 10 to achieve optimum spark intensity and current flow throughout the entire machining process. Thus, the machining efficiency of the EDM apparatus is maximized. Preferably, the machining process continues for a predetermined period of time. Alternatively, the machining continues until the spindle 43 has reached a predetermined ending vertical position. It is to be understood that the positioning control unit 61 may determine that there is no need for making adjustments in the vertical position of the vehicle wheel 10.

Alternatively, under preprogrammed instructions, when the positioning control unit 61 determines that the proper magnitude of spark intensity and/or current flow has been established, the positioning control unit 61 instructs positioning driver 60 to stop the movement of the vehicle wheel 10. Preferably, the machining process continues for a predetermined period of time. Alternatively, the machining process continues until the magnitude of spark intensity and/or current flow drop below a predetermined limit, as indicated by the spark sensor 62 or the current sensor (not shown), respectively. The position of the vehicle wheel 10 is not adjusted during the EDM operation under preprogrammed instruction operation.

The EDM process achieves extremely accurate results, particularly in regard to removing high points on the beadseats 26 and 28. The EDM process achieves this by machining on the molecular level. It is expected that the EDM apparatus 34 will finish the beadseats 26 and 28 with a radial runout as low as 0.0009". This is a significant improvement over prior art machining upon a conventional wheel lathe. Indeed, the inventor expects that this process may finish the beadseats 26 and 28 with radial runout so small that it can not be precisely measured by current conventional equipment. The present invention contemplates that a gauge may be built into the EDM apparatus 34 so that runout measurements could be taken during the machining process.

The present invention also contemplates a method for Electric Discharge Machining (EDM) a vehicle wheel. One embodiment of the method is illustrated by a flow chart, indicated generally at 70, shown in FIG. 4.

The method 70 begins in functional block 72 where an EDM apparatus for finish machining a vehicle wheel is provided.

The method 70 then proceeds to functional block 74 where a vehicle wheel is mounted upon the EDM apparatus. The vehicle wheel has an axis of rotation and an annular rim section having a surface coaxially disposed about the axis of rotation. The annular rim section includes an inboard beadseat and an outboard beadseat. Preferably, the vehicle wheel has been formed in a conventional manner and initially machined in a conventional manner, during which, the vehicle wheel beadseats are initially turned on a wheel lathe. The vehicle wheel is secured to a spindle of a support structure that is electrically connected to ground.

The method 70 then proceeds to functional block 76 where the vehicle wheel is at least partially immersed in a dielectric fluidic bath that contains an electrode. The electrode has a discharge surface that is formed as the inverse of at least one beadseat of the vehicle wheel.

The method 70 then proceeds to functional block 78 where the vehicle wheel is rotated in a first direction about the wheel axis.

The method 70 then proceeds to functional block 80 where the vehicle wheel is moved toward the electrode immersed in the dielectric fluidic bath and voltage is applied to the electrode.

The method 70 then proceeds to functional block 82 where the vehicle wheel is moved into a position proximate the electrode, where at least one spark is generated between the electrode discharge surface and the annular rim, whereby the annular rim surface is machined.

Although the method 70 has been described for a vehicle wheel that has been conventionally machined, it will be appreciated that the vehicle wheel may not have been conventionally machined before being mounted upon the EDM apparatus.

Figure 5:
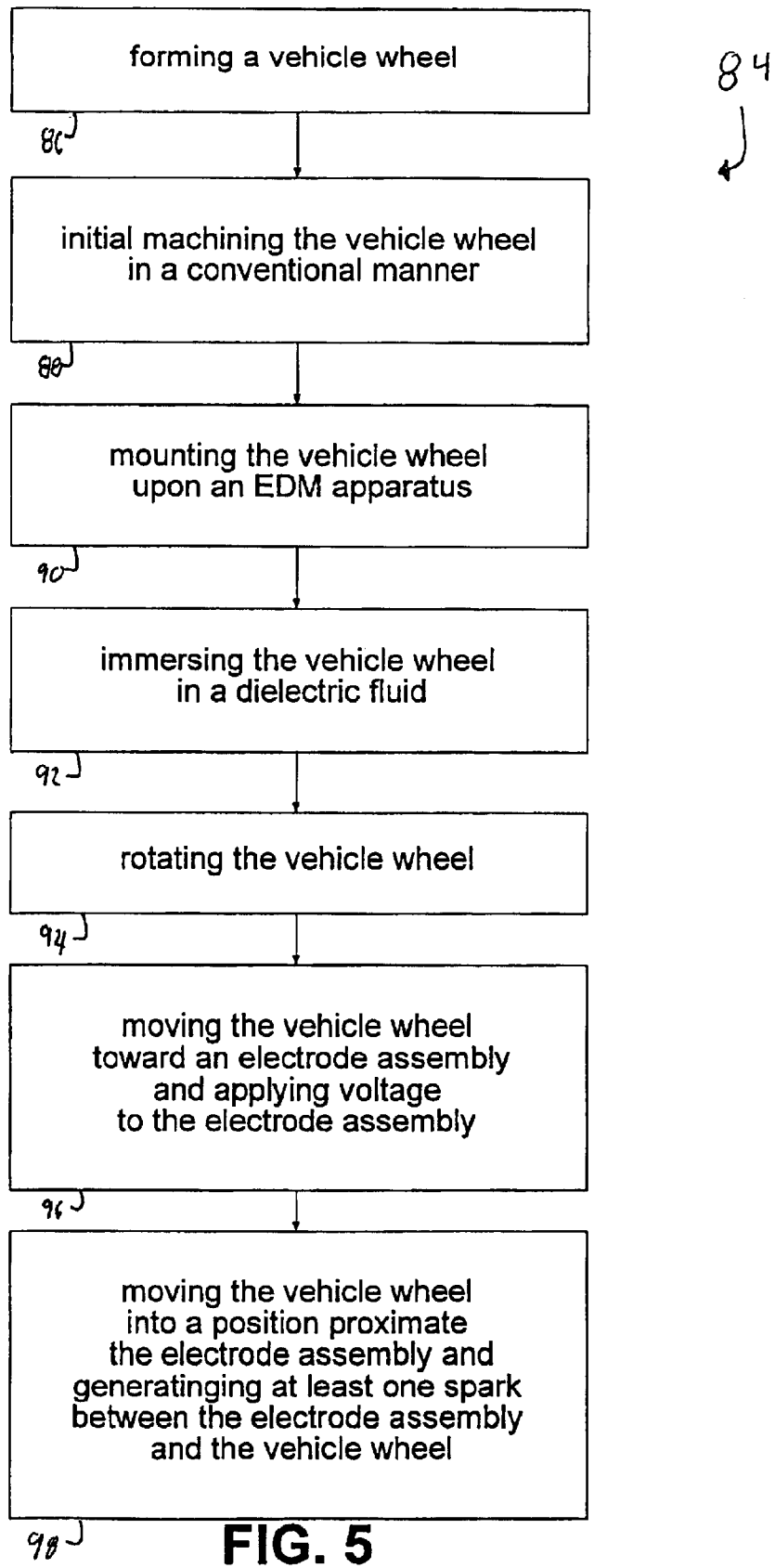
FIG. 5 is a flowchart of a method for manufacturing a vehicle wheel utilizing Electrical Discharge Machining.

The present invention further contemplates a method for manufacturing a vehicle wheel that includes Electric Discharge Machining (EDM), as illustrated by a flow chart, indicated generally at 84, shown in FIG. 5.

The method 84 begins in functional block 86 where a vehicle wheel is formed in a conventional manner. The vehicle wheel has an axis of rotation and an annular rim section having a surface coaxially disposed about the axis of rotation. The annular rim section includes an inboard beadseat and an outboard beadseat.

The method 94 proceeds to functional block 88 where the vehicle wheel is initially machined in a conventional manner, during which, the vehicle wheel beadseats are initially turned on a wheel lathe.

The method 84 then proceeds to functional block 90 where the vehicle wheel is mounted upon an EDM apparatus. The vehicle wheel is secured to a spindle of a support structure that is electrically connected to ground.

The method 84 then proceeds to functional block 92 where the vehicle wheel is at least partially immersed in a dielectric fluidic bath that contains an electrode. The electrode has a discharge surface that is formed as the inverse of at least one beadseat of the vehicle wheel.

The method 84 continues to functional block 94 where the vehicle wheel is rotated in a first direction about the wheel axis.

The method 84 next proceeds to functional block 96 where the vehicle wheel is moved toward the electrode immersed in the dielectric fluidic bath and voltage is applied to the electrode.

The method 84 then proceeds to functional block 98 where the vehicle wheel is moved into a position proximate the electrode, where at least one spark is generated between the electrode discharge surface and the annular rim, whereby the annular rim surface is machined.

Figure 4:
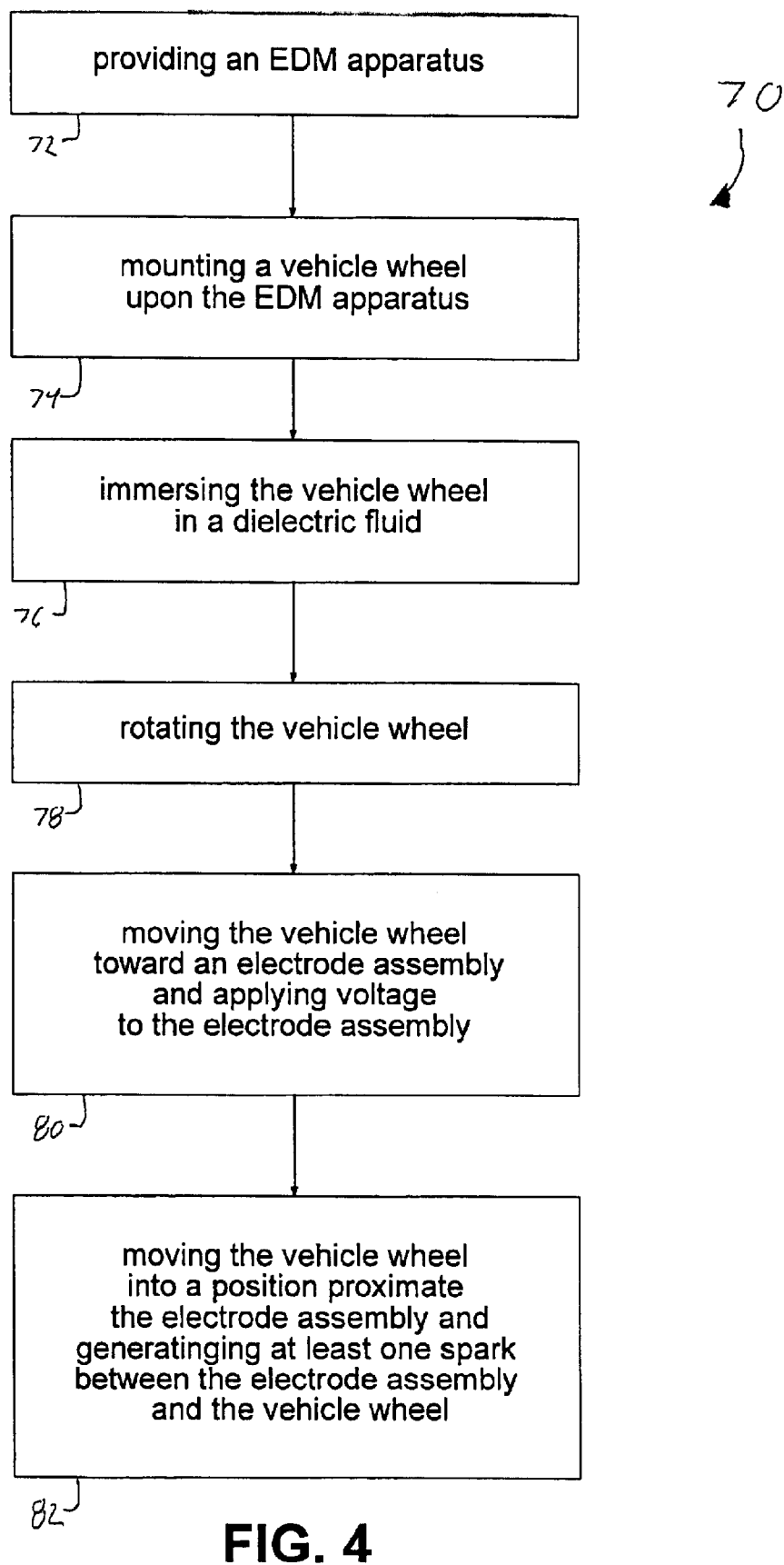
FIG. 4 is a flowchart of a method for finishing a vehicle wheel utilizing Electrical Discharge Machining.

It is to be understood that the flow charts in FIGS. 4 and 5 are exemplary and that the order of the steps can be other than as shown. For example, the rotating of the vehicle wheel may begin before or after the vehicle wheel is immersed in the dielectric fluid.

Further, it is to be understood that the steps as illustrated in the flow charts in FIGS. 4 and 5 are exemplary can be other than as specifically described. For example, voltage can be applied after having moved the wheel into position, or voltage can be applied after positioning the wheel horizontally, but before positioning the wheel vertically.

Although the steps of methods 70 and 84 have been described as including a conventionally machined vehicle wheel, it will be appreciated that the vehicle wheel may not be conventionally machined and that alternatively all of the machining may be done with only an EDM process.

Although the process has been described as applied to beadseats, it will be appreciated that the EDM process also can be used to finish other vehicle wheel surfaces than the beadseats, for example the surfaces of the wheel rim, the face of the wheel disc, the pilot hole and bolt holes. When an EDM process is applied to the wheel rim, the face of the wheel disc, the pilot hole and the bolt holes, the EDM electrode removes molecules to produce very accurately machined surfaces of the wheel rim, the face of the wheel disc, the pilot hole and bolt holes.

While the preferred embodiment of this invention has been explained and illustrated in regards to a one piece aluminum alloy cast wheel, it must be understood and will be appreciated that this invention can be applied to any suitable type of vehicle wheel, such as, for example, a two piece wheel such as a bimetal wheel, or a fabricated steel wheel.

Further, while the principal and mode of operation of this invention have been explained and illustrated in its preferred embodiment, it must be understood that this invention may be practiced otherwise than as specifically explained and illustrated without departing from its spirit or scope.

What is claimed is:

1. An Electric Discharge Machining apparatus for machining a vehicle wheel surface comprising:
    a dielectric fluidic bath;
    an electrode submerged in said dielectric fluidic bath;
    a movable support structure, said support structure adapted to support and rotate a vehicle wheel mounted upon said support structure in a position proximate said electrode: and
    a power supply for applying a voltage to said electrode for machining a surface of the vehicle wheel.

2. The apparatus of claim 1, wherein said electrode has a discharge surface, said discharge surface formed in a shape that is an inverse of a shape of a surface of the vehicle wheel.

3. The apparatus of claim 2, wherein said power supply is a pulsed power supply.

4. The apparatus of claim 2, wherein said discharge surface includes at least one projecting portion, said projecting portion including an intermediate flat portion for forming the surface of the vehicle wheel.

5. The apparatus of claim 4, wherein said discharge surface is adapted to machine a tire beadseat on the vehicle wheel.

6. The apparatus of claim 5 whereby said vehicle wheel is machined to have a beadseat having a radial runout between 0.0050 inches (0.1270 Millimeters) and 0.0009 inches (0.0229 Millimeters).

7. The apparatus of claim 2, wherein said apparatus further includes a positioning control unit that is electrically connected to said movable support structure and operative to cause movement of said support structure.

8. The apparatus of claim 7, wherein said apparatus further includes a spark sensor, electrically connected to said positioning control unit, said spark sensor operative to provide said positioning control unit with a control signal that is a function of the magnitude of the intensity of sparks generated between the electrode and the vehicle wheel, said positioning control unit being responsive to said control signal to cause movement of said support structure.

9. The apparatus of claim 7, wherein said apparatus further includes a current sensor, electrically connected between said power supply and said electrode and also electrically connected to said positioning control unit, said current sensor operative to provide said positioning control unit with a control signal that is a function of the magnitude of the current flow through the electrode and the vehicle wheel, said positioning control unit being responsive to said control signal to cause movement of said support structure.

10. A method of machining a vehicle wheel comprising the following steps:
  (a) providing an EDM apparatus, said EDM apparatus including a moveable support structure, the support structure including a spindle and the support structure being electrically connected to ground, the EDM apparatus further including an electrode having a discharge surface immersed in a dielectric fluidic bath, the electrode having a shape that is an inverse of at least one wheel surface;
  (b) mounting a vehicle wheel having an axis of rotation and an annular rim section having a rim surface coaxially disposed about the axis of rotation, upon the support structure;
  (c) immersing the vehicle wheel in the dielectric fluidic bath;
  (d) rotating the vehicle wheel in a first direction about the axis;
  (e) applying a voltage to the electrode; and
  (f) moving the vehicle wheel to a position proximate the electrode and generating at least one spark there between the electrode discharge surface and the wheel surface, such that the wheel surface is machined.

11. The method of claim 10, wherein the vehicle wheel in step (b) is a forged wheel.

12. The method of claim 10, wherein the vehicle wheel in step (b) is a cast wheel.

13. The method of claim 10, wherein, prior to step (b), the vehicle wheel is initially machined by turning on a conventional wheel lathe.

14. The method of claim 13, wherein the EDM apparatus includes a positioning control unit and further wherein during step (f) the positioning control unit is operative to cause the support structure to move the vehicle wheel.

15. The method of claim 14, wherein during step (f) the vehicle wheel is moved into an initial position proximate the electrode relative to a set of predetermined vertical and horizontal coordinates.

16. The method of claim 15, wherein the EDM apparatus further includes a current sensor connected between the electrode and a power supply, the power supply supplying the voltage to be applied to the electrode, and further wherein the method includes, after step (f), repositioning the vehicle wheel based upon a control signal provided by the current sensor, the control signal being a function of the magnitude of the current flow through the electrode and the vehicle wheel.

17. The method of claim 16, wherein the method further includes, after repositioning the vehicle wheel, supplying current to the electrode until a predetermined time period elapses.

18. The method of claim 17, wherein the method farther includes further repositioning of the vehicle wheel while supplying current to the electrode.

19. The method of claim 16, wherein the method further includes, after repositioning the vehicle wheel, supplying current to the electrode until the current flow falls below a predetermined magnitude.

20. The method of claim 16, wherein the wheel surface is a beadseat.

21. The method of claim 15, wherein the EDM apparatus further includes a spark sensor, the spark sensor operative to measure the intensity of sparks between the electrode and the vehicle wheel, and further wherein the method includes, after step (f), repositioning the vehicle wheel based upon a control signal provided by the spark sensor, the control signal being a function of the magnitude of the intensity of sparks generated.

22. The method of claim 21, wherein the method further includes, after repositioning the vehicle wheel, further generating sparks until a predetermined time period elapses.

23. The method of claim 22, wherein the method further includes, repositioning the vehicle wheel while generating sparks.

24. The method of claim 21, wherein the method further includes, after repositioning the vehicle wheel, generating sparks until the spark intensity falls below a predetermined magnitude.

25. The method of claim 21, wherein the wheel surface is a beadseat.

26. A method of machining a vehicle wheel comprising the following steps:
  (a) forming a vehicle wheel having an axis of rotation and an annular rim section having a rim surface coaxially disposed about the axis of rotation;
  (b) mounting the vehicle wheel upon an EDM apparatus, the EDM apparatus having a moveable support structure, the support structure including a spindle and the support structure being electrically connected to ground, the EDM apparatus further including an electrode having a discharge surface immersed in a dielectric fluidic bath, the electrode having a shape that is an inverse of at least one wheel surface;
  (c) immersing the vehicle wheel in the dielectric fluidic bath;
  (d) rotating the vehicle wheel in a first direction about the axis;
  (e) applying voltage to the electrode; and
  (f) moving the vehicle wheel to a position proximate the electrode and generating at least one spark there between the electrode discharge surface and the wheel surface, such that the wheel surface is machined.

* * * * *